(12) United States Patent
Zeller et al.

(10) Patent No.: US 8,110,241 B2
(45) Date of Patent: Feb. 7, 2012

(54) FOAMING SOLUBLE COFFEE POWDER CONTAINING PRESSURIZED GAS

(75) Inventors: Bary Lyn Zeller, Glenview, IL (US); Stefano Ceriali, Banbury (GB); Alan Gundle, Wappenham (GB)

(73) Assignee: Kraft Foods Global Brands LLC, Northfield, IL (US)

( * ) Notice: Subject to any disclaimer, the term of this patent is extended or adjusted under 35 U.S.C. 154(b) by 0 days.

(21) Appl. No.: 12/767,945

(22) Filed: Apr. 27, 2010

(65) Prior Publication Data

US 2010/0209583 A1 Aug. 19, 2010

Related U.S. Application Data

(62) Division of application No. 10/919,490, filed on Aug. 17, 2004, now Pat. No. 7,713,565.

(51) Int. Cl.
*A23F 5/28* (2006.01)

(52) U.S. Cl. ......... 426/654; 426/594; 426/465; 426/471
(58) Field of Classification Search ................ 426/564, 426/594, 465, 471
See application file for complete search history.

(56) References Cited

U.S. PATENT DOCUMENTS

| | | | | |
|---|---|---|---|---|
| 3,309,779 A * | 3/1967 | Ginnette et al. | ................ | 34/287 |
| 5,882,717 A * | 3/1999 | Panesar et al. | ................ | 426/595 |
| 6,048,567 A * | 4/2000 | Villagran et al. | ............ | 426/594 |
| 6,589,586 B2 * | 7/2003 | Beeson et al. | ................ | 426/570 |
| 6,669,976 B2 * | 12/2003 | Fritz | ............................ | 426/569 |
| 2003/0026836 A1 * | 2/2003 | Darbyshire et al. | .......... | 424/465 |

* cited by examiner

*Primary Examiner* — Anthony Weier
(74) *Attorney, Agent, or Firm* — Stites & Harbison PLLC; Marvin Petry; Stephen J. Weyer

(57) ABSTRACT

An instant coffee powder has dried soluble coffee in the form of particles or granules having internal voids filled with entrapped pressurized gas. Advantageously, when the coffee powder is dissolved in a beverage, the instant coffee powder produces a foam on the top surface of the beverage.

41 Claims, 1 Drawing Sheet

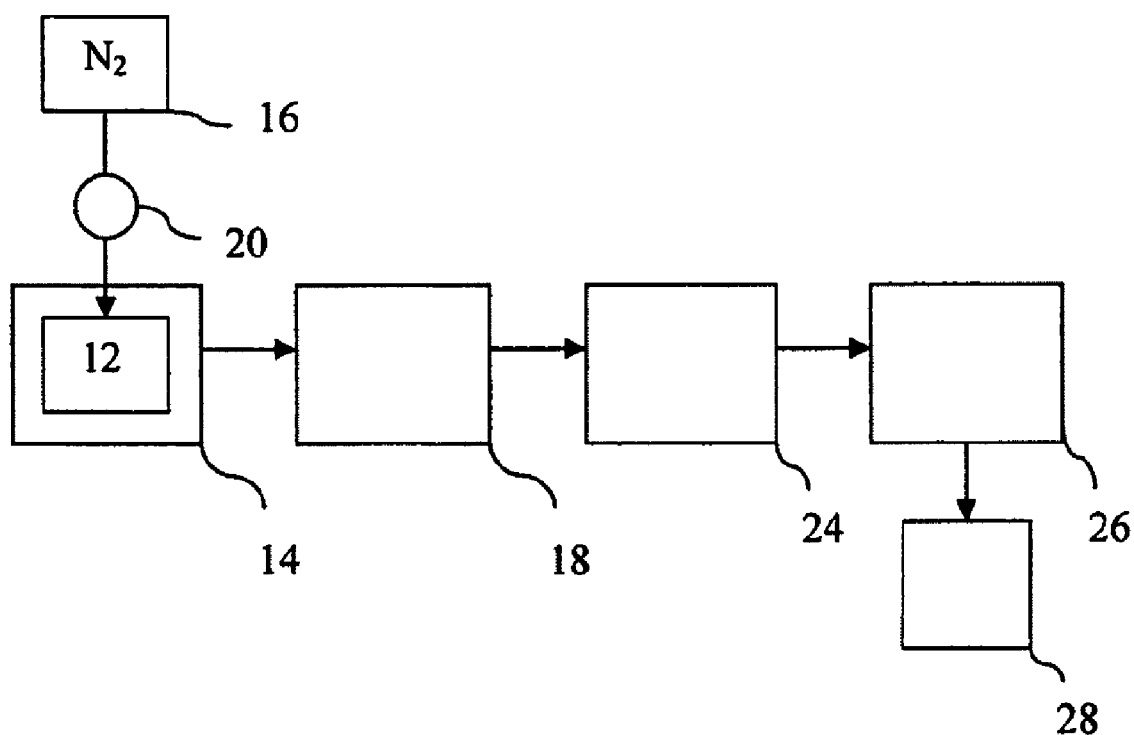

FOAMING SOLUBLE COFFEE POWDER CONTAINING PRESSURIZED GAS

CROSS REFERENCE TO RELATED APPLICATIONS

This is a divisional of U.S. patent application Ser. No. 10/919,490, filed Aug. 17, 2004, now issued as U.S. Pat. No. 7,713,565, herein incorporated by reference.

FIELD OF THE INVENTION

The present invention relates to an instant dry beverage composition, and more particularly, to a composition which upon reconstitution provides a beverage having a foam on its surface.

BACKGROUND OF THE INVENTION

Coffee extract is brewed by contacting the roasted or ground coffee with boiling or near-boiling water for a predetermined brewing time. The extract, including the solutes, is then separated from the insolubles to obtain the resulting beverage which is promptly consumed. However, in this day and age where there is a significant trend towards convenience foods, the use of instant coffees is preferred by a segment of coffee consumers.

Instant coffee is basically the dried water-extract of roasted, ground coffee. The beans used to make instant coffee are blended, roasted and ground as they are in the making of regular coffee. In order to make instant coffee, the roasted, ground coffee is then charged into columns called percolators through which hot water is pumped, resulting in a concentrated coffee extract. The extract is then dried, usually by either spray drying or freeze drying, to produce the final coffee powder which is sold to the consumer. Upon the addition of hot water to the dried coffee powder, coffee is obtained without the need to go through the usual and more complicated brewing steps.

As is explained in Canadian Patent No. 670,794 (to Standard Brands Incorporated), spray-dried instant coffee consists of hollow spheres or aggregates thereof which form a fine and persistent foam when hot water is added to the coffee powder. This is in contrast to the coarser and more quickly subsiding foam which is formed when a hot water-extract of ground roasted coffee is poured into a cup. Consequently, because typically brewed coffee does not have such a foam, the foam produced by the spray-dried instant coffee is undesirable. Accordingly, many techniques have been developed to reduce, alter or eliminate the foaming characteristics of spray-dried instant coffee. For example, in Canadian Patent No. 670,794, a small amount of a monoglyceride of a higher fatty acid is incorporated in the spray-dried coffee to change the appearance of the foam produced when the coffee is contacted with hot water. The new foam has the characteristics of the foam in a cup of brewed coffee rather than the more persistent fine foam normally associated with spray-dried instant coffee.

On the other hand, the production of foam on coffee is not always undesirable. In particular, espresso coffee is a special coffee beverage type that is winning increased approval with the consumer. Espresso coffee typically comprises finely milled roasted beans which are brewed rapidly with pressurized water/steam which coincidentally results in the formation of in-cup foam. The resulting espresso beverage provides body and flavor aspects very distinct from the normal cup of coffee. Espresso is said to have a dark, rich flavor and appearance and is accompanied by a head of lighter-colored froth or foam which espresso beverage devotees consider crucial. The foam contains colloidal oil droplets and solid particles which give the espresso its characteristic texture and mouth feel. It is to be noted that the froth or foam characteristic of espresso coffee is not at all similar to the foam formed from the spray-dried instant coffee described above.

As would be expected, due to its unique flavor and other characteristics, espresso coffee is not easily made. In order to produce a consistently high-quality espresso beverage, the brewing process must be controlled very closely, i.e., a very short brewing time, specific pressures, temperatures, volumes of water delivered to the ground coffee, the need for precise adjustments, etc. Consequently, espresso brewing machines are relatively complicated, large and expensive and require a certain amount of skill to operate. Accordingly, it would be preferable to find an alternative method for providing an espresso beverage, one which is simpler and easier to employ.

Although the flavor of espresso coffee may be mimicked by the use of dark roast Arabicas and extraction processing conditions, the foaming characteristics of espresso are not easily replicated as the foaming of roasted and ground espresso is primarily induced by high-pressure steam which is provided by an espresso machine. The high-pressure steam provides a source of sparging gas, which, with the aid of surface-active species present in the coffee, form foam cells. Espresso brewing also results in the emulsification of oil into the brew and the foam. The resultant foam consists of water, gas, surface-active species and oil, and has a creamy appearance and texture.

It is widely accepted that the protein present in unroasted coffee beans is not retained in roasted coffee or in soluble coffee powders produced from extracts of roasted coffee. Coffee protein is rapidly and substantially denatured and degraded by the high temperatures and chemical reactions that occur during roasting and extracting. See, for example, Coffee, Volume 1: Chemistry, R. J. Clarke and R. Macrae, Eds., Elsevier Applied Science Publishers, New York, 1987, pp. 138-143. As reported in Coffee, Recent Developments, R. J. Clarke and O. G. Vitzthum, Eds., Blackwell Science Ltd, London, 2001, p. 155, coffee beverages contain "transformed proteic material grouped under the broad name of melanoidins". Accordingly, soluble coffee powders, including soluble espresso powders, produced from roasted coffee are regarded as being devoid of protein. Unlike typical food foams, which are stabilized by proteins such as occur in milk, eggs, wheat, and the like, it is believed that carbohydrates, particularly coffee polysaccharides, stabilize espresso foam. As also reported in Coffee, Recent Developments, p. 15, the stability of espresso foams is directly related to the concentration of polysaccharide present and the foam stabilizing effect is attributed to viscosity imparted to the extract by galactomannan.

U.S. Pat. No. 5,882,717 to Panesar et al., incorporated herein by reference, discloses a method for making a spray-dried instant coffee using a process of foaming a coffee extract by gas injection followed by homogenizing the foamed coffee extract to reduce gas bubble size and then subsequently spray drying the homogenized extract to produce a soluble espresso coffee powder having voids formed by gas bubbles. As a result, the resulting entrapped gas bubbles at atmospheric pressure are provided by gas dispersed in a liquid extract prior to spray drying.

U.S. Pat. No. 6,713,113, incorporated herein by reference, discloses a powdered soluble foaming ingredient which has a matrix containing a carbohydrate, a protein and entrapped pressurized gas. The gas is released upon addition of the dry powder to liquid.

U.S. Pat. No. 6,953,592, incorporated herein by reference, discloses a method for forming tablets or powders of carbohydrate-based pharmaceuticals or foods which includes subjecting tablets or powders which comprise a beverage base such as soluble coffee, foamed powder, sugar and creamer to pressure and temperature to produce a tablet or powder with increased solubility or dispersability on contact with water. In addition, a method is disclosed which promotes the dissolution or dispersion of a tablet or non-foaming powder by subjecting the tablet or powder to pressurized gas so that gas is entrapped therein to promote dissolution or dispersion of the tablet or powder on contact with water. Improved dissolution of carbohydrate-based tablets comprised of spray-dried coffee and either carbohydrate crystalline sucrose or foamed carbohydrate powder and spray-dried creamer powder containing entrapped gas is demonstrated in working examples therein. However, U.S. Pat. No. 6,953,592 does not demonstrate in any working examples of manufacturing a foaming soluble coffee powder or foaming soluble espresso powder containing entrapped pressurized gas therein. Further, improved dissolution or dispersability of a coffee powder, alone or in combination with other ingredients, containing entrapped gas is not demonstrated in any working example therein.

U.S. Pat. Nos. 4,830,869 and 4,903,585, both to Wimmers, et al., incorporated herein by reference, disclose a method for making a coffee beverage having a thick layer of foamed coffee on its surface, similar in appearance to cappuccino coffee. A measured amount of spray-dried instant coffee and a small amount of cold water are combined with vigorous agitation to form a foamed coffee concentrate. Then, hot water is added to make a coffee beverage.

U.S. Pat. No. 4,618,500 to Forquer, incorporated herein by reference, discloses a method for preparing a brewed espresso-type coffee beverage which has a head of froth on the surface of the beverage. Relatively dry steam is injected into the brewed coffee beverage to produce the froth.

U.S. Pat. No. 3,749,378 to Rhodes, incorporated herein by reference, discloses an apparatus for foaming a coffee extract. Gas is introduced into the coffee extract and the foamed coffee is then spray-dried to make a soluble coffee product having a low bulk density.

Although soluble espresso coffee powders are available, there is still a need for a soluble dry espresso coffee composition which, upon reconstitution, exhibits a foam characteristic desired by true espresso connoisseurs. For example, prior resulting espresso beverages lack sufficient foam, the foam dissipates too quickly or there is a combination of both. Accordingly, an instant dry soluble espresso coffee product is desirable which provides foam characteristics of a conventionally made espresso beverage.

BRIEF SUMMARY OF THE INVENTION

The present invention, in one form thereof, is directed to providing an instant dry beverage composition comprising a soluble coffee having internal voids filled with pressurized gas. In one specific form, the soluble coffee releases expansive bubbles when reconstituted in water.

The invention in another form thereof, is directed to providing a method of preparing an instant beverage comprising a soluble coffee. The method includes heating dried soluble coffee under sufficient pressure thereby forcing gas into internal voids of the dried soluble coffee. The heated dried coffee powder is cooled and then depressurized resulting in a soluble coffee having internal voids filled with pressurized gas.

These and other objects of the present invention will become apparent from the detailed description which follows of the preferred embodiments.

BRIEF DESCRIPTION OF THE DRAWING

There follows a detailed description of preferred embodiments of the present invention, to be read together with the accompanying drawing, wherein:

The sole FIGURE is a schematic diagram of the process of the present invention.

DETAILED DESCRIPTION OF THE PREFERRED EMBODIMENTS

Referring now to the drawing, like elements are represented by like numerals.

The present invention is directed to an instant dry beverage composition comprising a soluble coffee having internal voids filled with a pressurized gas. In addition, the invention is directed to a process for making such a soluble instant beverage with improved in-cup foaming characteristics. A schematic diagram of the preferred process of the present invention is shown in the FIGURE. In the preferred process, spray-dried coffee 12 is placed in a pressure vessel 14. The spray-dried coffee 12 can be produced from a liquid coffee extract which has been subject to gas injection, i.e. gasification, prior to spray-drying. Alternatively, the spray-dried coffee can be produced by drying a liquid coffee extract which has not been subjected to gasification. The spray-dried coffee can be in the form of either a powder or a granular product.

Pressure vessel 14 is pressurized by nitrogen gas 16 supplied to the pressure vessel 14 at a desired pressure regulated by pressure regulator 20. Although this embodiment uses nitrogen gas, any other food grade gas or gas mixture could be used, including air, carbon dioxide, and nitrous oxide.

The pressure vessel is then placed in a preheated oven or bath or placed into a heating jacket heated by circulation of electric current or hot liquid at station 18. The dried coffee product is heated at a temperature in the range of 20° C. to 150° C. for 1 minute to 300 minutes and preferably in the range of 40° C. to 130° C. for 5 minutes to 200 minutes and more preferably in the range of 60° C. to 110° C. for 10 minutes to 150 minutes. The pressure of the pressure vessel 14 is in the range of 20 psi to 3000 psi and preferably within the range of 100 psi to 2000 psi and more preferably in the range of 500 psi to 1500 psi. Heating can cause the initial pressure delivered to the pressure vessel to increase considerably. The maximum pressure reached inside the pressure vessel during heating can be approximated by multiplying the initial pressure by the ratio of heating temperature to initial temperature using Kelvin units of temperature. For example, pressurizing the pressure vessel to 1000 psi at 25° C. (298 K) and then heating to 100° C. (373 K) should increase the pressure inside the pressure vessel to approximately 1250 psi.

Following heating, the pressurized dried coffee is cooled to room temperature by placing the pressure vessel 14 in a cooling jacket 24 which is water cooled. Following cooling, the pressure vessel 14 is depressurized at step 26 to release the final pressurized soluble coffee product 28.

The resulting soluble coffee has a bulk density and a tap density in the range of 0.1 g/cc to 0.7 g/cc, typically 0.2 g/cc to 0.6 g/cc, a skeletal density in the range of 0.3 g/cc to 1.4 g/cc, typically 0.5 g/cc to 1.3 g/cc, an internal void volume in the range of 5% to 80%, typically 10% to 65%, and contains pressurized gas in the range of 20 psi to 3000 psi, typically 100 psi to 2000 psi, and more typically 300-1500 psi. The soluble coffee containing entrapped pressurized gas generally has particle size between about 1 to 5000 microns, typically between about 5 to 2000 microns, and more typically between about 10 to 1000 microns.

The method of this invention can be applied to a variety of soluble coffees, including spray-dried, gas-injected spray-dried, gas-injected extruded, freeze-dried, and the like, as demonstrated in the examples provided herein. Application of this method to spray-dried coffee is preferred.

Bulk density (g/cc) is determined by measuring the volume (cc) that a given weight (g) of soluble coffee occupies when poured through a funnel into a graduated cylinder. Tap density (g/cc) is determined by pouring soluble coffee into a graduated cylinder, vibrating the cylinder until the coffee product settles to its lowest volume, recording the volume, weighing the product, and dividing weight by volume. Skeletal density (g/cc) is determined by measuring the volume of a weighed amount of soluble coffee using a helium pycnometer (Micromeritics AccuPyc 1330) and dividing weight by volume. Skeletal density is a measure of coffee product density that includes the volume of any voids present in individual soluble coffee particles that are sealed to the atmosphere and excludes the interstitial volume between coffee particles and the volume of any voids present in individual soluble coffee particles that are open to the atmosphere. The volume of these sealed voids, referred to herein as internal voids, is derived from also measuring the skeletal density of the soluble coffee product after grinding with mortar and pestle to remove or expose all internal voids to the atmosphere. This type of skeletal density, referred to herein as true density (g/cc), is the actual density of only the solid matter comprising the soluble coffee product. Internal void volume (%), the volume percent of internal voids contained in the particles comprising the soluble coffee product, is determined by subtracting the reciprocal true density (cc/g) from the reciprocal skeletal density (cc/g) and then multiplying by skeletal density (g/cc) and 100%.

The present process provides for a soluble coffee product 28 in accordance with the invention which is physically modified, where the modified soluble coffee product has internal voids filled with pressurized gas where the pressurized gas produces froth when the soluble coffee is reconstituted in water. Specifically, heating a commercial spray-dried coffee product under high pressure forces gas into internal voids. Conducting heating above the glass transition temperature of the soluble coffee product increases the amount of pressurized gas that is forced into internal voids of the then softened gas-permeable coffee structure. Cooling the heated and pressurized dried coffee product prior to depressurizing results in the cooled soluble coffee product retaining pressurized gas in internal voids. When the pressurized soluble coffee product is combined with water, the pressurized gas voids release a large volume of expansive bubbles that rise to the beverage surface to impart froth.

The glass transition temperature can be measured using established Differential Scanning Calorimetry or Thermal Mechanical Analysis techniques. The glass transition temperature marks a secondary phase change characterized by transformation of the soluble coffee product from a rigid glassy state to a softened rubbery state. In general, gas solubilities and diffusion rates are higher in materials at temperatures above their glass transition temperature.

The glass transition temperature of soluble coffee is typically between 40° C. to 100° C., but can be higher or lower depending on the specific chemical composition and moisture level. In general, lower average molecular weight and/or higher moisture will lower glass transition temperature. The glass transition temperature can intentionally be raised or lowered by simply decreasing or increasing, respectively, the moisture content of the coffee product using any suitable method known to one skilled in the art.

When soluble coffee is pressurized at a temperature at or above the glass transition temperature, it is common for some of the coffee particles to explode with a loud cracking sound during a brief time after depressurization due to bursting of localized regions of the coffee structure that are too weak to retain the pressurized gas. Microscopic examination of such coffee product typically reveals a greater number of broken hollow spheres than initially present in the untreated coffee, which increase the bulk density of the powder. The heated product often acquires a darker richer appearance that can provide an advantage for instant espresso products.

In contrast, when soluble coffee is pressurized at a temperature below the glass transition temperature and depressurized, it is less common for particles to explode. However, it is common for the particles to produce a faint popping sound during a brief time after depressurization. Powder appearance and bulk density are typically not significantly altered under these milder conditions, but skeletal density and internal void volume are typically significantly altered.

The present process can be used to produce an improved instant espresso beverage or to enhance the foaming capacity of instant cappuccino mixes. A wide range of heating times (5 minutes to 150 minutes) and temperatures (25° C. to 105° C.) and gas pressures (500 psi to 1300 psi) were tested to maximize gas content and foaming capacity.

The present pressurized coffee product dissolves in water to produce a stable froth without use of additives. Further, the resulting pressurized powder can be manufactured to have significantly higher bulk density, greater foaming capacity, and darker color than low-density foaming coffee products described in the prior art. The pressurized coffee product can be used as a foaming instant espresso product or can be blended with other dry food and beverage ingredients such as flavors, sweeteners, and creamers to formulate a wide variety of foaming instant coffee products. The pressurized coffee product is particularly suited for use in foaming instant cappuccino or latte type beverage mixes that are formulated with a foaming creamer powder composition containing protein, such as foaming creamer compositions described in U.S. Pat. No. 4,438,147 and in EP 0 458 310 or in U.S. Pat. No. 6,129,943, as a means to increase the volume of beverage froth produced upon reconstitution in liquid. In these and other coffee mix applications, the pressurized coffee product can be combined with or substituted for untreated coffee product to beneficially increase beverage froth volume without the need to introduce foreign ingredients, such as chemical carbonation reagents described in U.S. Pat. Nos. 5,721,003 and 5,780,092 or foaming compositions described in U.S. Pat. No. 6,713,113 and U.S. Patent Application Publication No. 2006/0110516, into the coffee mix.

Unlike U.S. Pat. Nos. 5,882,717 and 6,953,592 which disclose coffee containing entrapped gas bubbles at ambient, i.e., atmospheric pressure, the present soluble coffee includes internal voids filled with pressurized gas. As a result, the present pressurized gas results in significantly higher frothing capacity when the pressurized gas is released upon reconstitution of the soluble pressurized coffee in water.

In addition, the following examples are presented as illustrative of the claimed invention, and are not deemed to be limiting of the scope of the invention, as defined by the claims appended hereto, in any manner.

EXAMPLE 1

5 g of spray-dried soluble coffee powder having a glass transition temperature of 51° C. was placed in a 75 cc pressure vessel (stainless steel gas sampling cylinder; manufactured by Whitey Corporation; used in all examples herein except Example 8) and pressurized with 1000 psi nitrogen gas. The pressure vessel was placed in an oven at 80° C. for 2.5 hours. The pressure vessel was removed from the oven and cooled to room temperate under a stream of cold tap water. Subsequently, the cooled pressure vessel was opened to release pressure. The resulting powder was darker than the original spray-dried soluble coffee powder.

During the first few minutes after the removal of the powder from the pressure vessel, a small fraction of the coffee particles exploded with a loud cracking sound and were propelled out of the weighing dish in which they were placed. Prior to pressure treatment, the coffee powder had a bulk density of 0.21 g/cc, a tap density of 0.27 g/cc, a skeletal density of 1.00 g/cc and an internal void volume of approximately 32%. After the present treatment, the coffee powder had a bulk density of 0.36 g/cc, a tap density of 0.48 g/cc, a skeletal density of 1.32 g/cc and an internal void volume of approximately 11%.

Internal void volumes were calculated relative to the 1.47 g/cc true density measured for this soluble coffee via helium pycnometry analysis of the powder after grinding with mortar and pestle to remove or expose all voids to the atmosphere. The use of an equal weight of treated (i.e., containing pressurized gas) coffee powder in place of the untreated coffee in an instant cappuccino mix, using a weight ratio of approximately one part coffee, two parts sugar, and three parts foaming creamer, produced approximately 90% greater froth height when 11 g of the cappuccino mix was reconstituted with 130 ml of 88° C. water in a 250 ml beaker having 65 mm internal diameter. Only the cappuccino mix containing the treated coffee powder made a cracking sound when reconstituted. The instant cappuccino beverages prepared using untreated or treated coffee powder had excellent flavor.

Reconstitution of 1.0 g of treated coffee powder with 50 ml of 88° C. water in a 100 ml beaker having 46 mm internal diameter produced a dark approximately 30 mm high instant espresso beverage with desirable light-brown froth that covered the beverage surface to a height of 8 mm. Reconstitution of 1.0 g of untreated coffee powder under the same conditions produced a light coffee beverage without a continuous covering of froth. Only the treated coffee powder made a cracking sound when reconstituted. The instant espresso beverages prepared using untreated or treated coffee powder had excellent flavor.

Knowledge of the reconstituted cappuccino mix froth density and incremental froth volume contributed by the treated and untreated coffees was used to estimate the amount (corrected to room temperature and pressure) of gas released by each powder. It was estimated that the untreated coffee powder released only about 2.5 cc gas per gram of coffee while the treated coffee powder released about 14 cc gas per gram of coffee. Evaluation of the same treated coffee powder in the same cappuccino mix several months later revealed the enhanced foaming capacity of the treated powder did not significantly diminish with the passage of time.

Consideration of the internal void volume of the treated coffee powder suggests that about half the gas released by the powder was contained in pressurized internal voids and about half was contained in the solid matter in a dissolved state. It is believed that gas dissolved in the softened gas-permeable coffee matter during heating diffuses into internal voids until pressure equilibrium is reached or until the powder is cooled. Therefore, it is to be expected that the cooled particles should retain both gas entrapped in pressurized internal voids and gas dissolved in the solid coffee matter. This belief was supported by treating, under the same conditions of time, temperature, and pressure described above, a ground soluble coffee powder without internal voids that, after treatment, produced about half the incremental froth volume of the treated unground soluble coffee powder containing internal voids.

EXAMPLE 2

Another 5 g gram sample of the spray-dried soluble coffee powder of Example 1 was placed in a 75 cc pressure vessel and pressurized with 1000 psi nitrogen gas at 25° C. for 5 minutes. The pressure vessel was opened to release pressure. The resulting powder had the same color, bulk density, and appearance as the untreated spray-dried soluble coffee powder.

During the first few minutes after the removal of the powder from the pressure vessel, a faint popping/cracking sound was heard but no particle explosions were visible. Prior to pressure treatment, the coffee powder had a skeletal density of 1.00 g/cc and an internal void volume of approximately 32%. After the present treatment, the coffee powder had a skeletal density of 1.25 g/cc and an internal void volume of approximately 15%. Internal void volumes were calculated using the method described above. The use of an equal weight of treated (i.e., containing pressurized gas) coffee powder in place of the untreated coffee in an instant cappuccino mix, using a weight ratio of approximately one part coffee, two parts sugar, and three parts foaming creamer, produced approximately 30% greater froth height when 11 g of the cappuccino mix was reconstituted with 130 ml of 88° C. water in a 250 ml beaker having 65 mm internal diameter.

Knowledge of the reconstituted cappuccino mix froth density and incremental froth volume contributed by the treated and untreated coffees was used to estimate the amount (corrected to room temperature and pressure) of gas released by each powder. It was estimated that the untreated coffee powder released only about 2.5 cc gas per gram of coffee while the treated coffee powder released about 7.5 cc gas per gram of coffee. However, evaluation of the same treated coffee powder in the same cappuccino mix two days later revealed the foaming capacity of the treated powder had diminished to an intermediate level.

The pressure treatment significantly reduced the internal void volume of the coffee powder, indicating that a large proportion of voids were apparently opened to the atmosphere by the forces exerted by pressurization and/or depressurization. It appears that some pressurized gas forced into internal voids was temporarily retained, as could occur if the pressurized gas was forced into voids having relatively large volumes through very small openings that prevented rapid release of pressurized gas to the atmosphere after depressurization of the pressure vessel. The temporary increase in foaming capacity provided by soluble coffee powders pressurized at temperatures below their glass transition temperature can still provide significant utility if the coffee powder is reconstituted before all of the pressurized gas escapes to the atmosphere.

EXAMPLE 3

The following table summarizes the results obtained when additional 5 g samples of the spray-dried soluble coffee powder of Example 1 were treated at the conditions listed according to the method of Example 1 when an equal weight of each treated coffee powder was substituted for the untreated coffee powder in the instant cappuccino mix of Example 1. This example demonstrates the combined effects of treatment time, temperature, and pressure on the relative foaming capacity of the coffee powder in the reconstituted cappuccino mix.

| Time (minutes) | Temperature (° C.) | Initial Pressure (psi) | Approximate Maximum Pressure (psi) | Gas | % Increase in Cappuccino Froth Height (in 250 ml beaker) |
|---|---|---|---|---|---|
| 5 | 25 | 1000 | 1000 | $N_2$ | 30 |
| 150 | 60 | 600 | 700 | $CO_2$ | 30 |
| 90 | 60 | 1000 | 1150 | $N_2$ | 40 |
| 20 | 105 | 1000 | 1300 | $N_2$ | 50 |
| 150 | 60 | 1000 | 1150 | $N_2$ | 60 |
| 150 | 70 | 1000 | 1200 | $N_2$ | 70 |
| 120 | 80 | 500 | 600 | $N_2$ | 80 |
| 60 | 100 | 1000 | 1300 | $N_2$ | 90 |
| 60 | 90 | 1000 | 1250 | $N_2$ | 90 |
| 120 | 100 | 1000 | 1300 | $N_2$ | 90 |
| 150 | 80 | 1000 | 1200 | $N_2$ | 90 |

EXAMPLE 4

6 g of spray-dried soluble coffee powder having a glass transition temperature of 53° C. was placed in a 75 cc pressure vessel and pressurized with 1000 psi nitrogen gas. The pressure vessel was placed in an oven at 100° C. for 40 minutes. The pressure vessel was removed from the oven and cooled to room temperate under a stream of cold tap water. Subsequently, the cooled pressure vessel was opened to release pressure. The resulting powder was darker than the original spray-dried soluble coffee powder.

During the first few minutes after the removal of the powder from the pressure vessel, a small fraction of the coffee particles exploded with a loud cracking sound and were propelled out of the weighing dish in which they were placed. Prior to pressure treatment, the coffee powder had a bulk density of 0.21 g/cc, a tap density of 0.28 g/cc, a skeletal density of 1.03 g/cc and an internal void volume of approximately 29%. After the present treatment, the coffee powder had a bulk density of 0.25 g/cc, a tap density of 0.35 g/cc, a skeletal density of 1.28 g/cc and an internal void volume of approximately 12%.

Internal void volumes were calculated relative to the 1.45 g/cc true density measured for this soluble coffee via helium pycnometry analysis of the powder after grinding with mortar and pestle to remove or expose all voids to the atmosphere. The use of an equal weight of treated (i.e., containing pressurized gas) coffee powder in place of the untreated coffee in an instant cappuccino mix, using a weight ratio of approximately one part coffee, two parts sugar, and three parts optimized foaming creamer, produced approximately 70% greater froth height when 12 g of the cappuccino mix was reconstituted with 130 ml of 88° C. water in a 250 ml beaker having 65 mm internal diameter. The optimized foaming creamer used in this example had greater internal void volume containing atmospheric pressure gas and produced approximately 50% greater froth height than the foaming creamer used in Examples 1-3 when mixed with the same untreated coffee powder and sugar in the same proportions and reconstituted in water under the same conditions. Only the cappuccino mix containing the treated coffee powder made a cracking sound when reconstituted.

The instant cappuccino beverages prepared using untreated or treated coffee powder had excellent flavor. However, release of a greater volume of gas from the treated coffee powder on contact with water decreased particle wetability, which impaired dispersability and dissolution of the treated powder relative to the untreated powder. The cappuccino mix containing the untreated coffee powder dispersed and dissolved essentially instantaneously (within five seconds) after addition of water, without the need for stirring. In contrast, the cappuccino mix containing the treated coffee powder did not disperse and dissolve instantaneously upon addition of water, as evidenced by the presence of undissolved unwetted powder covering a large portion of the beaker bottom and wall. In the absence of stirring, it took about 30 seconds for the cappuccino mix containing the treated coffee powder to completely dissolve. However, this impairment in powder dispersability and dissolution was suitably remedied by stirring the reconstituted mix containing the treated coffee powder to expedite dispersion and dissolution. The type and extent of impaired coffee powder dispersability and dissolution, caused by release of entrapped pressurized gas, demonstrated in this example are typical of foaming soluble coffee powders containing entrapped pressurized gas prepared according to this invention.

Reconstitution of 1.0 g of treated coffee powder with 50 ml of 88° C. water in a 100 ml beaker having 46 mm internal diameter produced a dark approximately 30 mm high instant espresso beverage with desirable light-brown froth that covered the beverage surface to a height of 10 mm. Reconstitution of 1.0 g of untreated coffee powder under the same conditions produced a light coffee beverage without a continuous covering of froth. Only the treated coffee powder made a cracking sound when reconstituted.

The instant espresso beverages prepared using untreated or treated coffee powder had excellent flavor. However, the instant espresso beverage prepared using the treated coffee powder beneficially had slightly darker color and stronger coffee flavor than the beverage prepared using the untreated coffee powder. The untreated coffee powder dispersed and dissolved essentially instantaneously upon addition of water to provide the instant espresso beverage. However, the instant espresso beverage prepared using the treated coffee powder contained a small amount of undispersed undissolved powder in the froth that took about ten seconds to completely dissolve in the absence of stirring. This type of impairment, caused by release of entrapped pressurized gas, demonstrated in this example is typical of foaming soluble coffee powders containing entrapped pressurized gas prepared according to this invention.

Knowledge of the reconstituted cappuccino mix froth density and incremental froth volume contributed by the treated and untreated coffees was used to estimate the amount (corrected to room temperature and pressure) of gas released by each powder. It was estimated that the untreated coffee powder released only about 2.5 cc gas per gram of coffee while the treated coffee powder released about 16.5 cc gas per gram of coffee. Evaluation of the same treated coffee powder in the same cappuccino mix several weeks later revealed the enhanced foaming capacity of the treated powder did not significantly diminish with the passage of time.

EXAMPLE 5

An additional 2 g sample of the untreated spray-dried soluble coffee powder of Example 4 was mixed with 10 g of sugar. The mix was reconstituted with 240 ml of cold skim milk in a 400 ml beaker having 72 mm internal diameter to produce a cold cappuccino beverage at a height of approximately 65 mm that was completely covered by froth at a height of about 4 mm. The untreated powder was replaced with an equal weight of another sample of the treated coffee powder of Example 4. Reconstituting the mix in the same manner produced a beverage at a height of approximately 65 mm that was completely covered by froth at a height of about 10 mm. The froth produced by the treated and untreated powders had creamy texture and small bubble size typical of a cappuccino drink, but only the mix containing the treated powder produced a cracking sound when reconstituted. A continuous covering of froth was not produced in the cold cappuccino beverage without addition of treated or untreated powder. All cappuccino beverages had excellent flavor.

EXAMPLE 6

6 g of spray-dried soluble espresso coffee powder manufactured according to the teachings of U.S. Pat. No. 5,882,717 having a glass transition temperature of 74° C. was placed in a 75 cc pressure vessel and pressurized with 1000 psi nitrogen gas. The pressure vessel was placed in an oven at 100° C. for 30 minutes. The pressure vessel was removed from the oven and cooled to room temperate under a stream of cold tap water. Subsequently, the cooled pressure vessel was opened to release pressure. The resulting powder was darker than the original spray-dried soluble coffee powder.

During the first few minutes after the removal of the powder from the pressure vessel, a small fraction of the coffee particles exploded with a loud cracking sound and were propelled out of the weighing dish in which they were placed. Prior to pressure treatment, the coffee powder had a bulk density of 0.19 g/cc, a tap density of 0.22 g/cc, a skeletal density of 0.72 g/cc and an internal void volume of approximately 51%. After the present treatment, the coffee powder had a bulk density of 0.32 g/cc, a tap density of 0.40 g/cc, a skeletal density of 1.27 g/cc and an internal void volume of approximately 14%.

Internal void volumes were calculated relative to the 1.47 g/cc true density measured for this soluble coffee via helium pycnometry analysis of the powder after grinding with mortar and pestle to remove or expose all voids to the atmosphere. The use of an equal weight of treated (i.e., containing pressurized gas) coffee powder in place of the untreated coffee in an instant cappuccino mix, using a weight ratio of approximately one part coffee, two parts sugar, and three parts optimized foaming creamer of Example 4, produced approximately 45% greater froth height when 11 g of the cappuccino mix was reconstituted with 130 ml of 88° C. water in a 250 ml beaker having 65 mm internal diameter. Only the cappuccino mix containing the treated coffee powder made a cracking sound when reconstituted.

Reconstitution of 1.0 g of treated coffee powder with 50 ml of 88° C. water in a 100 ml beaker having 46 mm internal diameter produced a dark approximately 30 mm high instant espresso beverage with desirable light-brown froth that covered the beverage surface to a height of 13 mm. Reconstitution of 1.0 g of untreated coffee powder under the same conditions produced a lighter coffee beverage with a much thinner layer of froth that covered the beverage surface to a height of less than 4 mm. Only the treated coffee powder made a cracking sound when reconstituted.

Knowledge of the reconstituted cappuccino mix froth density and incremental froth volume contributed by the treated and untreated coffees was used to estimate the amount (corrected to room temperature and pressure) of gas released by each powder. It was estimated that the untreated coffee powder released only about 2.5 cc gas per gram of coffee while the treated coffee powder released about 11.5 cc gas per gram of coffee.

EXAMPLE 7

6 g of granular soluble coffee powder, produced by extruding a gas-injected coffee melt and comminuting the cooled melt, having a glass transition temperature of 73° C. was placed in a 75 cc pressure vessel and pressurized with 1000 psi nitrogen gas. The pressure vessel was placed in an oven at 100° C. for 30 minutes. The pressure vessel was removed from the oven and cooled to room temperate under a stream of cold tap water. Subsequently, the cooled pressure vessel was opened to release pressure. The resulting coffee was darker than the original granular extruded soluble coffee. Surprisingly, the treated coffee was no longer granular, but had a smaller particle size and general appearance similar to spray dried coffee powder. It is believed that the force of pressurization/depressurization caused the granules to be reduced to a smaller size.

During the first few minutes after the removal of the coffee from the pressure vessel, a small fraction of the coffee particles exploded with a loud cracking sound and were propelled out of the weighing dish in which they were placed. Prior to pressure treatment, the granular coffee powder had a bulk density of 0.19 g/cc, a tap density of 0.21 g/cc, a skeletal density of 0.70 g/cc and an internal void volume of approximately 52%. After the present treatment, the coffee powder had a bulk density of 0.34 g/cc, a tap density of 0.43 g/cc, a skeletal density of 1.27 g/cc and an internal void volume of approximately 14%.

Internal void volumes were calculated relative to the 1.47 g/cc true density measured for this soluble coffee via helium pycnometry analysis of the powder obtained after grinding with mortar and pestle to remove or expose all voids to the atmosphere. The use of an equal weight of treated (i.e., containing pressurized gas) coffee powder in place of the untreated coffee in an instant cappuccino mix, using a weight ratio of approximately one part coffee, two parts sugar, and three parts optimized foaming creamer of Example 4, produced approximately 60% greater froth height when 11 g of the cappuccino mix was reconstituted with 130 ml of 88° C. water in a 250 ml beaker having 65 mm internal diameter. Only the cappuccino mix containing the treated coffee powder made a cracking sound when reconstituted.

Reconstitution of 1.0 g of treated coffee powder with 50 ml of 88° C. water in a 100 ml beaker having 46 mm internal diameter produced a dark approximately 30 mm high instant espresso beverage with desirable light-brown froth that covered the beverage surface to a height of 12 mm. Reconstitution of 1.0 g of untreated granular coffee powder under the same conditions produced a light coffee beverage without a continuous covering of froth. Only the treated coffee powder made a cracking sound when reconstituted.

Knowledge of the reconstituted cappuccino mix froth density and incremental froth volume contributed by the treated and untreated coffees was used to estimate the amount (corrected to room temperature and pressure) of gas released by each coffee. It was estimated that the untreated granular coffee powder released only about 2.5 cc gas per gram of coffee while the treated coffee powder released about 14 cc gas per gram of coffee.

EXAMPLE 8

100 g of granular freeze-dried soluble coffee powder having a glass transition temperature of approximately 60° C.

was placed in a two-liter pressure vessel (stainless steel reaction cylinder manufactured by Parr Corporation) and pressurized with 870 psi nitrogen gas. The coffee inside the pressure vessel was stirred at 90 rpm using an internal anchor stirrer while the vessel was heated using an external heater jacket. The temperature of the coffee powder was increased to 90° C. (internal temperature) and held at this temperature for 15 minutes with continued stirring. The pressure inside the vessel increased to approximately 1060 psi as a result of external heating. Cooling was applied using circulation of cold water through an external jacket and the temperature of the stirred coffee powder was reduced to room temperature. Subsequently, the cooled pressure vessel was vented to release pressure and then opened. The resulting granular coffee powder was darker than the original granular freeze-dried soluble coffee powder.

During the first few minutes after the removal of the coffee from the pressure vessel, a small fraction of the coffee granules exploded with a loud cracking sound. Prior to pressure treatment, the coffee granules had a bulk density of 0.24 g/cc, a tap density of 0.27 g/cc, a skeletal density of 1.48 g/cc and an internal void volume of approximately 1%. After the present treatment, the coffee granules had a bulk density of 0.63 g/cc, a tap density of 0.72 g/cc, a skeletal density of 1.33 g/cc and an internal void volume of approximately 11%. The internal void volume increased as a result of pressure treatment, presumably from closure of some open particle voids and/or from creation of some new voids between fused particles during heating.

Internal void volumes were calculated relative to the 1.49 g/cc true density measured for this soluble coffee via helium pycnometry analysis of the powder obtained after grinding with mortar and pestle to remove or expose all voids to the atmosphere. The use of an equal weight of treated (i.e., containing pressurized gas) granular coffee powder in place of the untreated granular coffee powder in an instant cappuccino mix, using a weight ratio of approximately one part coffee, two parts sugar, and three parts optimized foaming creamer, produced approximately 55% greater froth height when 11 g of the cappuccino mix was reconstituted with 130 ml of 88° C. water in a 250 ml beaker having approximately 70 mm internal diameter. Only the cappuccino mix containing the treated granular coffee powder made a cracking sound when reconstituted.

Reconstitution of 1.0 g of treated granular coffee powder with 50 ml of 88° C. water in a 100 ml beaker having approximately 50 mm internal diameter produced a dark approximately 25 mm high instant espresso beverage with desirable light-brown froth that covered the beverage surface to a height of 6 mm. Reconstitution of 1.0 g of untreated granular coffee powder under the same conditions produced a light coffee beverage without a continuous covering of froth. Only the treated granular coffee powder made a cracking sound when reconstituted.

Knowledge of the reconstituted cappuccino mix froth density and incremental froth volume contributed by the treated and untreated coffees was used to estimate the amount (corrected to room temperature and pressure) of gas released by each granular coffee powder. It was estimated that the untreated granular coffee powder released only about 2.5 cc gas per gram of coffee while the treated granular coffee powder released about 10 cc gas per gram of coffee.

Although the invention has been described in considerable detail with respect to preferred embodiments, it will be apparent that the invention is capable of numerous modifications and variations, apparent to those skilled in the art, without departing from the spirit and scope of the invention.

What is claimed is:

1. An instant coffee powder comprising dried soluble coffee in the form of particles or granules having internal voids filled with entrapped pressurized gas, wherein particles or granules are filled with pressurized gas by subjecting the particles or granules to heat at a temperature at or above the glass transition temperature of the particles or granules under pressurized gas at a sufficient pressure above atmospheric pressure, thereby forcing gas into internal voids of the particles or granules, and
   whereby the particles or granules, after subjecting to the heat, have increased bulk density and gas content; and
   the particles or granules having increased bulk density and foaming capacity do not have increased solubility or dispersibility when contacted with water as compared to the particles or granules prior to subjecting the particles or granules to heat.

2. The instant coffee powder of claim 1, wherein said soluble coffee releases expansive bubbles when reconstituted in liquid to produce surface forming froth.

3. The instant coffee powder of claim 1, wherein said soluble coffee has a bulk density in the range of 0.1 to 0.7 g/cc.

4. The instant coffee powder of claim 3, wherein said soluble coffee has a skeletal density in the range of 0.3 to 1.4 g/cc.

5. The instant coffee powder of claim 4, wherein said soluble coffee has an internal void volume in the range of 5% to 80%.

6. The instant coffee powder of claim 1, wherein said soluble coffee has a skeletal density in the range of 0.3 to 1.4 g/cc.

7. The instant coffee powder of claim 1, wherein said soluble coffee has an internal void volume in the range of 5% to 80%.

8. The instant coffee powder of claim 7, wherein the skeletal density is in the range of 0.5 to 1.3 g/cc.

9. The instant coffee powder of claim 7, wherein the internal void volume is in the range of 10% to 65%.

10. The instant coffee powder of claim 1, wherein said soluble coffee releases at least about 3 cc volume of gas per gram of soluble coffee when reconstituted in liquid.

11. The instant coffee powder of claim 1, wherein said soluble coffee releases at least about 12 cc volume of gas per gram of soluble coffee when reconstituted in liquid.

12. The instant coffee powder of claim 1, wherein said soluble coffee produces at least about 4 cc volume of froth when reconstituted in liquid.

13. The instant coffee powder of claim 1, wherein pressurized gas is at least at 20 psi.

14. The instant coffee powder of claim 1, wherein pressurized gas is in the range of 100 psi to 2000 psi.

15. The instant coffee powder of claim 1, wherein said soluble coffee has a tap density in the range of 0.1 to 0.7 g/cc.

16. The instant coffee powder of claim 1, wherein the soluble coffee is selected from the group consisting of spray-dried, gas-injected spray-dried, gas-injected extruded, and freeze-dried coffee.

17. The instant coffee powder of claim 1, wherein the coffee powder consists essentially of dried soluble coffee.

18. The instant coffee powder of claim 1, wherein the coffee powder consists of dried soluble coffee.

19. The instant coffee powder of claim 1, wherein the instant coffee powder produces foam when dissolved in a liquid due to the release of gas from the dried soluble coffee particles or granules.

20. An instant coffee powder having increased bulk density and foaming capacity produced by a method comprising:

(a) heating an instant coffee powder, consisting essentially of dried soluble coffee in the form of particles or granules having internal voids, to a temperature at or above the glass transition temperature of the dried soluble coffee particles or granules under pressurized gas at a sufficient pressure above atmospheric pressure, thereby forcing gas into internal voids of the dried soluble coffee particles or granules;

(b) cooling the heated instant coffee powder to a temperature below the glass transition temperature of the dried soluble coffee particles or granules; and (c) depressurizing the cooled instant coffee powder, wherein the depressurized cooled dried soluble coffee particles or granules have internal voids filled with entrapped pressurized gas, thereby producing the instant coffee powder having increased bulk density and foaming capacity, whereby the instant coffee powder having increased density and foaming capacity as a result of said method, has increased bulk density and gas content; and whereby the instant coffee powder having increased bulk density and foaming capacity does not have increased solubility or dispersibility when contacted with water as compared to the instant coffee powder prior to said method.

21. The instant coffee powder of claim 20, wherein, in the method producing the coffee powder, said (b) cooling is conducted while maintaining substantially the same pressure at which said heating occurs.

22. The instant coffee powder of claim 20, wherein, in the method producing the coffee powder, said (a) heating is conducted in the range of 20° C. to 150° C.

23. The instant coffee powder of claim 20, wherein the method forming the coffee powder having increased bulk density further comprises (d) drying a liquid coffee extract to form the dried soluble coffee particles or granules for use in said (a) heating.

24. The instant coffee powder of claim 20, wherein, in the method producing the coffee powder having increased bulk density, said (d) drying the liquid coffee comprises drying the liquid coffee which has not been subject to gasification.

25. The instant coffee powder of claim 20, wherein the depressurized cooled dried soluble coffee particles or granules have internal voids filled with pressurized gas at least at 20 psi.

26. The instant coffee powder of claim 20, wherein the depressurized cooled dried soluble coffee particles or granules have internal voids filled with pressurized gas in the range of 20 psi to 3000 psi.

27. The instant coffee powder of claim 20, wherein the instant coffee powder, after being subjected to said method, has a bulk density in the range of 0.1 to 0.7 g/cc.

28. The instant coffee powder of claim 20, wherein the depressurized cooled dried soluble coffee particles or granules have a tap density in the range of 0.1 to 0.7 g/cc.

29. The instant coffee powder of claim 20, wherein the depressurized cooled dried soluble coffee particles or granules have a skeletal density in the range of 0.3 to 1.4 g/cc.

30. The instant coffee powder of claim 20, wherein the depressurized cooled dried soluble coffee particles or granules have an internal void volume in the range of 5% to 80%.

31. The instant coffee powder of claim 20, wherein the dried soluble coffee is selected from the group consisting of spray-dried, gas-injected spray-dried, gas-injected extruded, and freeze-dried coffee.

32. The instant coffee powder of claim 20, wherein said (a) heating the instant coffee powder comprises heating dried soluble coffee having internal voids prior to said (a) heating.

33. The instant coffee powder of claim 20, wherein said (a) heating is at a temperature which does not produce a melt of the instant coffee powder.

34. The instant coffee powder of claim 20, wherein the instant coffee powder consists essentially of dried soluble coffee.

35. The instant coffee powder of claim 20, wherein the instant coffee powder having increased bulk density and foaming capacity produces foam when dissolved in a liquid due to the release of gas from the depressurized cooled dried soluble coffee particles or granules.

36. The instant coffee powder of claim 20, wherein, upon reconstitution of the instant coffee powder having increased bulk density and foaming capacity with water, the instant coffee powder has enhanced foaming capacity measured by increased foam height produced by release of gas formed into the internal voids of the dried soluble coffee particles or granules, as compared with the coffee powder prior to said method when dissolved in a liquid, due to the release of gas from the dried soluble coffee particles or granules having entrapped pressurized gas as a result of said method.

37. A foaming instant coffee product comprising the instant coffee powder of claim 1.

38. The foaming instant coffee product of claim 37, wherein the coffee product is selected from the group consisting of an instant espresso product mix, a foaming instant cappuccino product mix and a latte product mix.

39. A foaming instant coffee product comprising the instant coffee powder of claim 20.

40. A foaming instant coffee beverage produced from dissolving the coffee powder of claim 1 in liquid.

41. The foaming instant coffee beverage of claim 40, wherein the beverage is produced by dissolving the coffee powder selected from the group consisting of an instant espresso product mix, a foaming instant cappuccino product mix and a latte product mix, in the liquid.

* * * * *